(12) United States Patent
Stuart

(10) Patent No.: US 6,318,789 B1
(45) Date of Patent: Nov. 20, 2001

(54) AUTOMOTIVE WINDSHIELD SCREEN DEVICE

(76) Inventor: Patrick Stuart, 9632 Lockhart Rd., Denham Springs, LA (US) 70726-8314

( * ) Notice: Subject to any disclaimer, the term of this patent is extended or adjusted under 35 U.S.C. 154(b) by 0 days.

(21) Appl. No.: 09/544,441

(22) Filed: Apr. 7, 2000

(51) Int. Cl.[7] ............................................. B60J 3/02
(52) U.S. Cl. ........................................ 296/97.8; 296/97.4
(58) Field of Search ................................. 296/97.4, 97.8; 168/370.22, 287, 310, 311, DIG. 2, DIG. 3

(56) References Cited

U.S. PATENT DOCUMENTS

| | | | |
|---|---|---|---|
| 972,422 | * 10/1910 | Whitmore | 160/287 |
| 1,459,180 | * 6/1923 | Hein | 296/97.8 |
| 5,076,633 | * 12/1991 | Hsu et al. | 296/97.8 X |

* cited by examiner

Primary Examiner—Joseph D. Pape

(57) ABSTRACT

A automotive windshield screen device for keeping an interior of an automobile relatively cool. The automotive windshield screen device includes a rod. The rod is elongate and has a first end and a second end. The first end is rotatably coupled to an inside portion of the automobile and positioned substantially adjacent to a first upper corner of the windshield. A turning mechanism for rotating the rod is mounted to an inside portion of the automobile and positioned substantially adjacent to a second upper corner of the windshield. The second end of the rod is mechanically coupled to the turning mechanism. An actuating mechanism turns on the turning mechanism in a first or second direction. The actuating mechanism is operationally coupled to the turning mechanism. A power supply supplies power to the turning mechanism and is operationally coupled to the actuating mechanism. A panel has a first edge and a second edge. The first edge is fixedly coupled to the rod such that the panel may be wound about the rod.

9 Claims, 2 Drawing Sheets

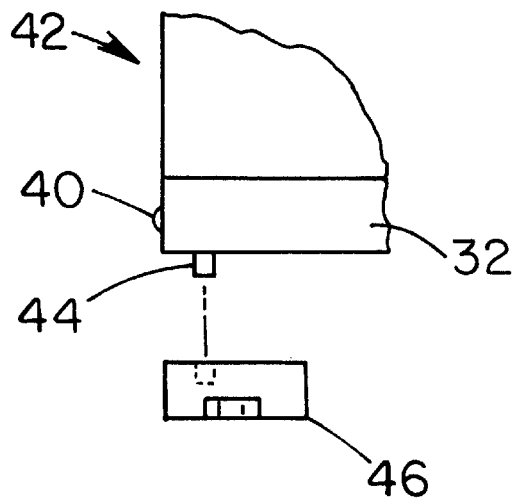
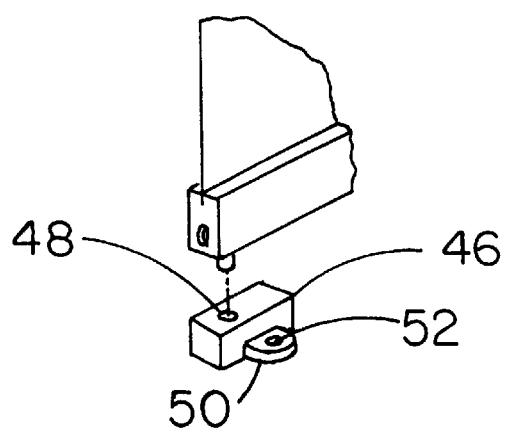
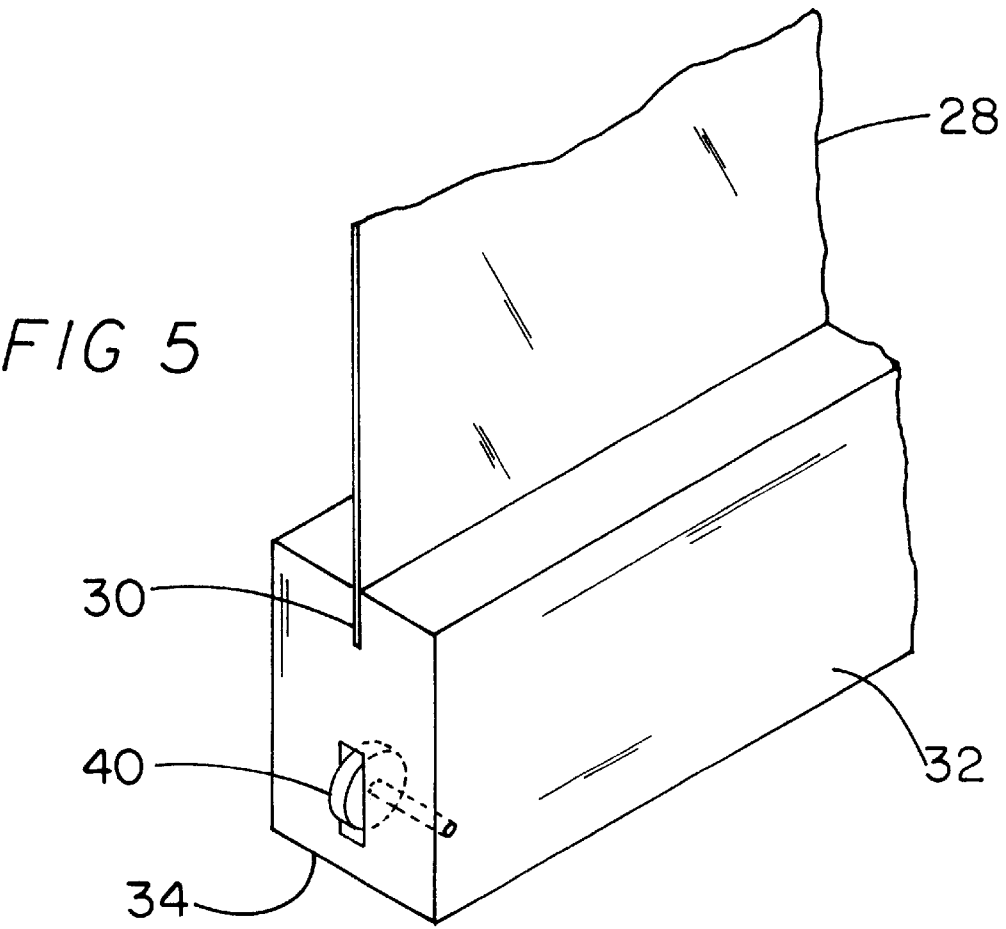

AUTOMOTIVE WINDSHIELD SCREEN DEVICE

BACKGROUND OF THE INVENTION

1. Field of the Invention

The present invention relates to windshield screens and more particularly pertains to a new automotive windshield screen device for keeping an interior of an automobile relatively cool.

2. Description of the Prior Art

The use of windshield screens is known in the prior art. More specifically, windshield screens heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,344,206; 5,042,866; 1,755,734; U.S. Des. Pat. No. 375,713; U.S. Pat. Nos. 2,493,192; and 5,720,508.

While these devices fulfill their respective, particular objectives and requirements, the aforementioned patents do not disclose a new automotive windshield screen device. The inventive device includes a rod. The rod is elongate and has a first end and a second end. The first end is rotatably coupled to an inside portion of the automobile and positioned substantially adjacent to a first upper corner of the windshield. A turning means for rotating the rod is mounted to an inside portion of the automobile and positioned substantially adjacent to a second upper corner of the windshield. The second end of the rod is mechanically coupled to the turning means. An actuating means turns on the turning means in a first or second direction. The actuating means is operationally coupled to the turning means. A power supply supplies power to the turning means and is operationally coupled to the actuating means. A panel has a first edge and a second edge. The first edge is fixedly coupled to the rod such that the panel may be wound about the rod.

In these respects, the automotive windshield screen device according to the present invention substantially departs from the conventional concepts and designs of the prior art, and in so doing provides an apparatus primarily developed for the purpose of keeping an interior of an automobile relatively cool.

SUMMARY OF THE INVENTION

In view of the foregoing disadvantages inherent in the known types of windshield screens now present in the prior art, the present invention provides a new automotive windshield screen device construction wherein the same can be utilized for keeping an interior of an automobile relatively cool.

The general purpose of the present invention, which will be described subsequently in greater detail, is to provide a new automotive windshield screen device apparatus and method which has many of the advantages of the windshield screens mentioned heretofore and many novel features that result in a new automotive windshield screen device which is not anticipated, rendered obvious, suggested, or even implied by any of the prior art windshield screens, either alone or in any combination thereof.

To attain this, the present invention generally comprises a rod. The rod is elongate and has a first end and a second end. The first end is rotatably coupled to an inside portion of the automobile and positioned substantially adjacent to a first upper corner of the windshield. A turning means for rotating the rod is mounted to an inside portion of the automobile and positioned substantially adjacent to a second upper corner of the windshield. The second end of the rod is mechanically coupled to the turning means. An actuating means turns on the turning means in a first or second direction. The actuating means is operationally coupled to the turning means. A power supply supplies power to the turning means and is operationally coupled to the actuating means. A panel has a first edge and a second edge. The first edge is fixedly coupled to the rod such that the panel may be wound about the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automotive windshield screen device apparatus and method which has many of the advantages of the windshield screens mentioned heretofore and many novel features that result in a new automotive windshield screen device which is not anticipated, rendered obvious, suggested, or even implied by any of the prior art windshield screens, either alone or in any combination thereof.

It is another object of the present invention to provide a new automotive windshield screen device which may be easily and efficiently manufactured and marketed.

It is a further object of the present invention to provide a new automotive windshield screen device which is of a durable and reliable construction.

An even further object of the present invention is to provide a new automotive windshield screen device which is susceptible of a low cost of manufacture with regard to both materials and labor, and which accordingly is then susceptible of low prices of sale to the consuming public, thereby making such automotive windshield screen device economically available to the buying public.

Still yet another object of the present invention is to provide a new automotive windshield screen device which provides in the apparatuses and methods of the prior art some of the advantages thereof, while simultaneously overcoming some of the disadvantages normally associated therewith.

Still another object of the present invention is to provide a new automotive windshield screen device for keeping an interior of an automobile relatively cool.

Yet another object of the present invention is to provide a new automotive windshield screen device which includes a rod. The rod is elongate and has a first end and a second end. The first end is rotatably coupled to an inside portion of the automobile and positioned substantially adjacent to a first upper corner of the windshield. A turning means for rotating the rod is mounted to an inside portion of the automobile and positioned substantially adjacent to a second upper corner of the windshield. The second end of the rod is mechanically coupled to the turning means. An actuating means turns on the turning means in a first or second direction. The actuating means is operationally coupled to the turning means. A power supply supplies power to the turning means and is operationally coupled to the actuating means. A panel has a first edge and a second edge. The first edge is fixedly coupled to the rod such that the panel may be wound about the rod.

Still yet another object of the present invention is to provide a new automotive windshield screen device that resists the passage of sunlight into an interior of the car through the windshield such that the interior temperature remains relatively cooler.

Even still another object of the present invention is to provide a new automotive windshield screen device that electrically moves the panel between and open and a closed position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic front view of the locking means of the present invention.

FIG. 4 is a schematic perspective view of the locking means of the present invention.

FIG. 5 is a schematic perspective view of an end of the bar and a roller of the present invention.

DESCRIPTION OF THE PREFERRED EMBODIMENT

Figure 1:
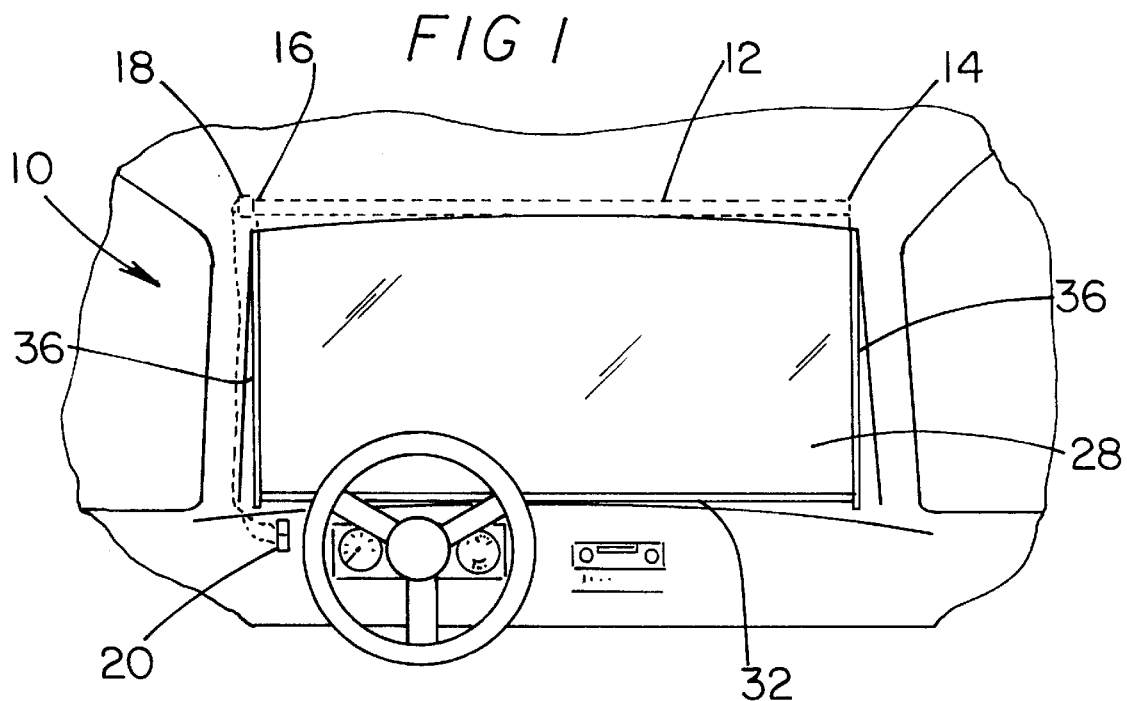
FIG. 1 is a schematic front view of a new automotive windshield screen device according to the present invention.
Figure 2:
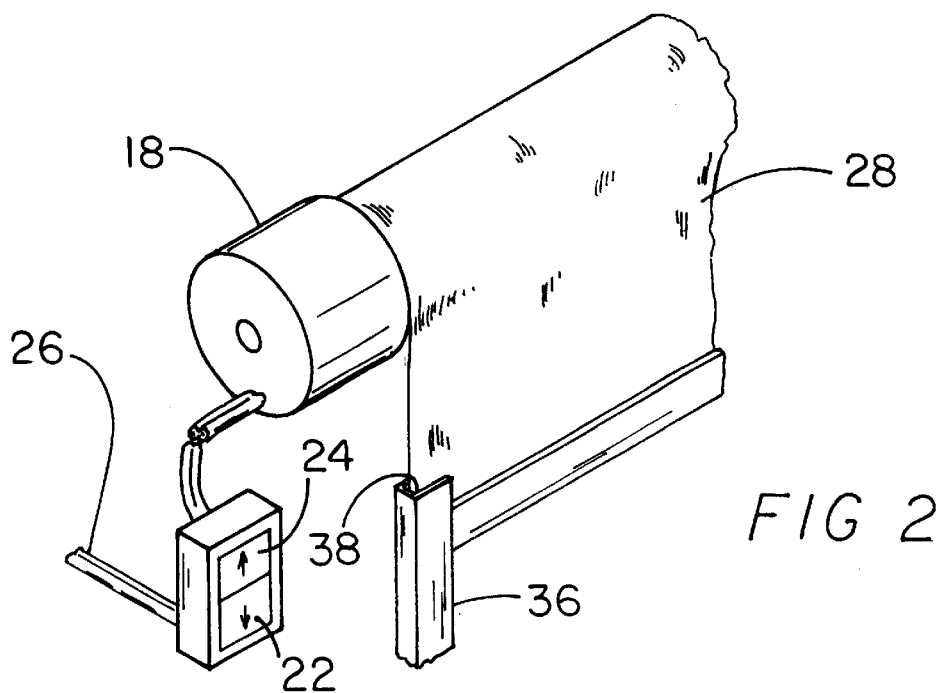
FIG. 2 is a schematic perspective view of the present invention.

With reference now to the drawings, and in particular to FIGS. 1 through 5 thereof, a new automotive windshield screen device embodying the principles and concepts of the present invention and generally designated by the reference numeral 10 will be described.

As best illustrated in FIGS. 1 through 5, the automotive windshield screen device 10 generally comprises a rod 12 which is rotated by a turning means thereby raising and lowering a panel. The rod 12 is elongate and has a first end 14 and a second end 16. The first end 14 is rotatably coupled to an inside portion of an automobile and positioned substantially adjacent to a first upper corner of the windshield of the automobile.

The turning means 18 rotates the rod 12. The turning means 18 is mounted to an inside portion of the automobile and positioned substantially adjacent to a second upper corner of the windshield. The second end 16 of the rod 12 is mechanically coupled to the turning means 18. The turning means 18 ideally comprises an electric motor. The turning means 18 is a conventional electric motor having reverse and forward capabilities, hereinafter referred to as a first and second direction. The turning means and rod may be mounted within the ceiling of the automobile to keep them out of view.

An actuating means 20 turns on the turning means 18 in a first or second direction. The actuating means 20 comprises a pair of switches 22, 24. A first switch 22 is for turning on the turning means in the first direction and a second switch 24 is for turning on the turning means in the second direction. The actuating means 20 is operationally coupled to the turning means 18 and can be mounted anywhere within the automobile.

A power supply 26 supplies power to the turning means. The power supply is operationally coupled to the actuating means. The power supply would generally be the battery of the automobile.

The panel 28 has a first edge, not shown, and a second edge 30. The first and second 30 edges have a length substantially equal to a length of the rod 12. The first edge is fixedly coupled to the rod 12 such that the panel 28 may be wound about the rod 12. The panel 28 is substantially opaque to block out sunlight. Ideally, the panel 28 comprises a plastic which is flexible for being wound about the rod 12.

A bar 32, which is elongate, is fixedly coupled to the second edge the panel. The bar 32 has a first end 34 and a second end not shown. The bar 32 has a length substantially equal to a length of the panel.

A pair of guide rails 36 guides the bar 32 with respect to the windshield. Each of the guide rails 36 is elongate, and each of the rails has a channel 38 therein. The channels 38 extend between a pair of ends of the guide rails 36. The channels 38 have a width adapted for receiving an end of the bar 32. Each of the guide rails 36 is mounted to an interior of the automobile. A first of the guide rails 36 is mounted generally adjacent to the first side edge of the windshield and a second of the guide rails is mounted generally adjacent to the second side edge of the windshield such that the channels 38 are generally facing each other. Each of the ends of the bar 32 is slidably mounted in one of the channels.

A roller assembly rolls the ends of the bar in the channels. The roller assembly comprises a pair of rollers 40. The first roller is rotatably mounted in the first end 34 of the bar 32 and the second roller is rotatably mounted in the second end of the bar 32 such that each of the rollers extends away from the bar as in FIG. 5 and each is in communication with one of the channels 38.

A locking assembly 42 locks the panel in a closed position. The locking assembly comprising a pair of male members and a pair of female members. Each of the male members comprises a lug 44, and each of the lugs 44 is integrally coupled to a bottom edge of the bar 32. The lugs 44 are each located generally adjacent to one of the ends of the bar 32. Each of the female members comprises a block 46 and has an aperture therein 48 for removably receiving the lug 44. Each of the blocks 46 has a tab 50 thereon has an opening 52 therein for receiving a fastening means such as a screw for fastening the female members to a dashboard of the automobile. The female members are positioned such that the female members may receive the male members.

In use, the bar 32 is generally adjacent to the top edge of the windshield. The user presses the first switch 22 to cause the rod 12 to rotate which allows the panel 28 to come down and allows the bar 32 to be guided down the guide rails 36. At the bottom the user snaps the lugs 44 into the apertures 48 to hold the panel 28 in place. When the driver wants to drive again, the second switch 24 is used to pull the bar back up.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automatic automotive window screen device for blocking sunlight entering a windshield of an automobile, the windshield having a top edge, a bottom edge, a first side edge and a second side edge, said device comprising:
   a rod, said rod being elongate and having a first end and a second end, said first end being rotatably coupled to an inside portion of the automobile and positioned substantially adjacent to a first upper corner of the windshield;
   a turning means for rotating said rod, said turning means being mounted to an inside portion of the automobile and positioned substantially adjacent to a second upper corner of the windshield, said second end of said rod being mechanically coupled to said turning means;
   an actuating means for turning on said turning means in a first or second direction, said actuating means being operationally coupled to said turning means;
   a power supply for supplying power to said turning means, said power supply being operationally coupled to said actuating means;
   a panel, said panel having a first edge and a second edge, said first edge being fixedly coupled to said rod such that said panel may be wound about said rod;
   a bar, said bar being elongate, said bar being fixedly coupled to said second edge said panel, said bar having a first end and a second end; and
   a locking assembly for locking said panel in a closed position, said locking assembly comprising a pair of male members and a pair of female members, each of said male members comprising a lug, each of said lugs being integrally coupled to a bottom edge of said bar, each of said lugs being located generally adjacent to one of the ends of said bar, each of said female members comprising a block having an aperture therein for removably receiving said lug, each of said blocks having a tab thereon having an opening therein for receiving a fastening means for fastening said female members to a dashboard of the automobile, said female members being positioned such that said female members may receive said male members.

2. The automatic automotive window screen device as in claim 1, wherein said panel is substantially opaque.

3. The automatic automotive window screen device as in claim 1, further comprising:
   a pair of guide rails, each of said guide rails being elongate, each of said rails having a channel therein, said channels extending between a pair of ends of said guide rails, said channels having a width adapted for receiving an end of said bar, each of said guide rails being mounted to an interior of said automobile, a first of said guide rails being mounted generally adjacent to said first side edge of the windshield and a second of said guide rails being mounted generally adjacent to said second side edge of the windshield such that said channels are generally facing each other, wherein each of the ends of the bar are slidably mounted in one of the channels.

4. The automatic automotive window screen device as in claim 3, further comprising:
   a roller assembly for rolling the ends of said bar in said channels, said roller assembly comprising a first and second roller, said first roller being rotatably mounted in said first end of said bar and said second roller being rotatably mounted in said second end of said bar such that each of said rollers extends away from said bar and are in communication with one of said channels.

5. An automatic automotive window screen device for blocking sunlight entering a windshield of an automobile, the windshield having a top edge, a bottom edge, a first side edge and a second side edge, said device comprising:
   a rod, said rod being elongate and having a first end and a second end, said first end being rotatably coupled to an inside portion of the automobile and positioned substantially adjacent to a first upper corner of the windshield;
   a turning means for rotating said rod, said turning means being mounted to an inside portion of the automobile and positioned substantially adjacent to a second upper corner of the windshield, said second end of said rod being mechanically coupled to said turning means, said turning means comprising an electric motor;
   an actuating means for turning on said turning means in a first or second direction, said actuating means comprising a pair of switches, a first switch being for turning on said turning means in said first direction and a second switch being for turning on said turning means in said second direction, said actuating means being operationally coupled to said turning means;
   a power supply for supplying power to said turning means, said power supply being operationally coupled to said actuating means;
   a panel, said panel having a first edge and a second edge, said first and second edges having a length substantially equal to a length of said rod, said first edge being fixedly coupled to said rod such that said panel may be wound about said rod, said panel being substantially opaque, said panel comprising a plastic;

a bar, said bar being elongate, said bar being fixedly coupled to said second edge said panel, said bar having a first end and a second end, said bar having a length substantially equal to a length of said panel;

a pair of guide rails, each of said guide rails being elongate, each of said rails having a channel therein, said channel extending between a pair of ends of said guide rails, said channels having a width adapted for receiving an end of said bar, each of said guide rails being mounted to an interior of said automobile, a first of said guide rails being mounted generally adjacent to said first side edge of the windshield and a second of said guide rails being mounted generally adjacent to said second side edge of the windshield such that said channels are generally facing each other, wherein each of the ends of the bar are slidably mounted in one of the channels;

a roller assembly for rolling the ends of said bar in said channels, said roller assembly comprising a first and second roller, said first roller being rotatably mounted in said first end of said bar and said second roller being rotatably mounted in said second end of said bar such that each of said rollers extends away from said bar and are in communication with one of said channels; and a locking assembly for locking said panel in a closed position, said locking assembly comprising a pair of male members and a pair of female members, each of said male members comprising a lug, each of said lugs being integrally coupled to a bottom edge of said bar, each of said lugs being located generally adjacent to one of the ends of said bar, each of said female members comprising a block having an aperture therein for removably receiving said lug, each of said blocks having a tab thereon having an opening therein for receiving a fastening means for fastening said female members to a dashboard of the automobile, said female members being positioned such that said female members may receive said male members.

6. An automatic automotive window screen device for blocking sunlight entering a windshield of an automobile, the windshield having a top edge, a bottom edge, a first side edge and a second side edge, said device comprising:

an elongate rod having a first end and a second end, said first end being rotatably coupled to an inside portion of the automobile and positioned substantially adjacent to a first upper corner of the windshield;

a rotation means for rotating said rod;

an actuating means for selectively supplying power to said rotation means, said actuating means controlling a rotational direction of said rotation means;

a panel having a first edge and a second edge, said first edge being fixedly coupled to said rod such that said panel may be wound about said rod;

an elongate bar fixedly coupled to said second edge said panel, said bar having a first end and a second end; and a locking assembly for locking said panel in a closed position, said locking assembly comprising a pair of male members and a pair of female members, each of said male members extending from a bottom edge of said bar, each of said male members being located generally adjacent to one of the ends of said bar, each of said female members having an aperture formed therein for removably receiving one of said male members, each of said female members having a tab thereon with an opening for receiving a fastening means for fastening said female members to a dashboard of the automobile.

7. The automatic automotive window screen device as in claim 6, wherein said panel is substantially opaque.

8. The automatic automotive window screen device as in claim 6, further comprising:

a pair of guide rails, each of said guide rails being elongate, each of said rails having a channel therein, said channels extending between a pair of ends of said guide rails, said channels having a width adapted for receiving an end of said bar, each of said guide rails being mounted to an interior of said automobile, a first of said guide rails being mounted generally adjacent to said first side edge of the windshield and a second of said guide rails being mounted generally adjacent to said second side edge of the windshield such that said channels are generally facing each other, wherein each of the ends of the bar are slidably mounted in one of the channels.

9. The automatic automotive window screen device as in claim 8, further comprising:

a roller assembly for rolling the ends of said bar in said channels, said roller assembly comprising a first and second roller, said first roller being rotatably mounted in said first end of said bar and said second roller being rotatably mounted in said second end of said bar such that each of said rollers extends away from said bar and are in communication with one of said channels.

* * * * *